(12) United States Patent
Schurig et al.

(10) Patent No.: US 8,045,565 B1
(45) Date of Patent: Oct. 25, 2011

(54) METHOD AND APPARATUS FOR AN ENVIRONMENTALLY HARDENED ETHERNET NETWORK SYSTEM

(75) Inventors: Alma K. Schurig, Cedar Hills, UT (US); Keith R. Anderson, Springville, UT (US); Guy Chang, Springville, UT (US); Larry G. Erdmann, Springville, UT (US)

(73) Assignee: Brookline Flolmstead LLC, Las Vegas, NV (US)

( * ) Notice: Subject to any disclaimer, the term of this patent is extended or adjusted under 35 U.S.C. 154(b) by 1820 days.

(21) Appl. No.: 09/988,467

(22) Filed: Nov. 20, 2001

(51) Int. Cl.
*H04L 12/56* (2006.01)

(52) U.S. Cl. .......................... 370/400; 333/101; 333/160

(58) Field of Classification Search .................. 370/400; 333/101, 160
See application file for complete search history.

(56) References Cited

U.S. PATENT DOCUMENTS

| | | | |
|---|---|---|---|
| 3,750,281 A * | 8/1973 | Belling | 30/90.8 |
| 3,860,748 A | 1/1975 | Everhart et al. | |
| 3,987,240 A | 10/1976 | Schultz | |
| 4,255,609 A * | 3/1981 | Charlebois et al. | 174/41 |
| 4,271,514 A | 6/1981 | Parras et al. | |
| 4,468,571 A * | 8/1984 | Heavey et al. | 307/66 |
| 4,766,536 A | 8/1988 | Wilson, Jr. et al. | |
| 4,800,236 A * | 1/1989 | Lemke | 174/36 |
| 4,834,673 A * | 5/1989 | Beinhaur et al. | 439/422 |
| 4,839,531 A | 6/1989 | Stemmons et al. | |
| 4,897,841 A | 1/1990 | Gang, Jr. | |
| 4,947,389 A | 8/1990 | Eng et al. | |
| 5,033,112 A | 7/1991 | Bowling et al. | |
| 5,081,621 A | 1/1992 | Sugimoto | |
| 5,145,402 A * | 9/1992 | Plyler et al. | 439/459 |
| 5,148,144 A | 9/1992 | Sutterlin et al. | |
| 5,191,579 A | 3/1993 | Matsushita et al. | |
| 5,202,780 A | 4/1993 | Fussanger | |
| 5,218,676 A | 6/1993 | Ben-Ayed et al. | |
| 5,309,437 A | 5/1994 | Perlman et al. | |
| 5,369,518 A * | 11/1994 | Aslami et al. | 398/171 |
| 5,372,840 A * | 12/1994 | Kleyer et al. | 427/117 |
| 5,394,402 A | 2/1995 | Ross | |

(Continued)

FOREIGN PATENT DOCUMENTS

EP          1009156          6/2000

(Continued)

OTHER PUBLICATIONS

Official Action in U.S. Appl. No. 11/318,396 dated Dec. 30, 2008, 9 pages.

(Continued)

*Primary Examiner* — Jason Mattis

(57) ABSTRACT

In an environmentally hardened network, a data and power distribution cable is employed in connection with reliable end connectors, high performance physical layer transceivers clocked at a lower rate than is specified and full duplex switched packet transmission techniques between switched nodes in order to extend operational distance between network elements. In a specific embodiment, the data and power distribution cable comprises a data distribution element, a power distribution element, an optional strain distribution element, an optional hollow conduit, and an extra shield and outdoor sheath. The cable may incorporate: 1) a Gel filled outdoor UTP (CAT-5) cable; 2) end connectors of type DB-9 [D-Sub] for connection of the UTP to network equipment; 3) power transmission cable of wire gauge sufficient to carry the power required by network equipment (switches, etc) for the specific segment of the network; and optionally 4) a hollow conduit that permits installation of optical fiber before or after installation of the cable.

39 Claims, 5 Drawing Sheets

U.S. PATENT DOCUMENTS

| | | | |
|---|---|---|---|
| 5,420,858 A | | 5/1995 | Marshall et al. |
| 5,426,739 A | * | 6/1995 | Lin et al. ............... 710/305 |
| 5,428,806 A | | 6/1995 | Pocrass |
| 5,444,702 A | | 8/1995 | Burnett et al. |
| 5,450,399 A | | 9/1995 | Sugita |
| 5,461,195 A | * | 10/1995 | Freeman et al. ............ 174/23 R |
| 5,477,091 A | | 12/1995 | Fiorina et al. |
| 5,487,061 A | | 1/1996 | Bray |
| 5,497,371 A | | 3/1996 | Ellis et al. |
| 5,530,203 A | * | 6/1996 | Adams et al. .................. 174/36 |
| 5,530,860 A | | 6/1996 | Matsuura |
| 5,559,377 A | | 9/1996 | Abraham |
| 5,572,517 A | | 11/1996 | Safadi |
| 5,600,644 A | | 2/1997 | Chang et al. |
| 5,608,446 A | | 3/1997 | Carr et al. |
| 5,654,985 A | | 8/1997 | Crayford et al. |
| 5,677,974 A | * | 10/1997 | Elms et al. .................... 385/101 |
| 5,699,276 A | | 12/1997 | Roos |
| 5,701,120 A | | 12/1997 | Perelman et al. |
| 5,726,851 A | * | 3/1998 | Knapp .......................... 361/104 |
| 5,754,451 A | | 5/1998 | Williams |
| 5,815,662 A | | 9/1998 | Ong |
| 5,847,751 A | | 12/1998 | Safadi |
| 5,857,075 A | * | 1/1999 | Chung .......................... 709/223 |
| 5,867,484 A | | 2/1999 | Shennfield |
| 5,892,912 A | | 4/1999 | Suzuki et al. |
| 5,896,382 A | | 4/1999 | Davis et al. |
| 5,896,385 A | | 4/1999 | Achilleoudis |
| 5,898,387 A | | 4/1999 | Davis et al. |
| 5,898,674 A | | 4/1999 | Mawhinney et al. |
| 5,898,687 A | | 4/1999 | Harriman et al. |
| 5,910,954 A | | 6/1999 | Bronstein et al. |
| 5,920,802 A | | 7/1999 | Bellows et al. |
| 5,925,097 A | | 7/1999 | Gopinath et al. |
| 5,926,101 A | | 7/1999 | Dasgupta |
| 5,937,428 A | | 8/1999 | Jantz |
| 5,950,111 A | | 9/1999 | Georger et al. |
| 5,960,411 A | | 9/1999 | Hartman et al. |
| 5,963,556 A | | 10/1999 | Varghese et al. |
| 5,966,667 A | | 10/1999 | Halloran et al. |
| 5,973,683 A | | 10/1999 | Cragun et al. |
| 5,978,373 A | | 11/1999 | Hoff et al. |
| 5,982,767 A | | 11/1999 | McIntosh |
| 5,982,854 A | | 11/1999 | Ehreth |
| 5,994,998 A | | 11/1999 | Fisher et al. |
| 6,003,079 A | | 12/1999 | Friedrich et al. |
| 6,005,598 A | | 12/1999 | Jeong |
| 6,007,372 A | * | 12/1999 | Wood ........................... 439/502 |
| 6,009,097 A | | 12/1999 | Han |
| 6,016,307 A | | 1/2000 | Kaplan et al. |
| 6,023,467 A | | 2/2000 | Abdelhamid et al. |
| 6,023,563 A | | 2/2000 | Shani |
| 6,023,734 A | | 2/2000 | Ratcliff et al. |
| 6,058,367 A | | 5/2000 | Sutcliffe et al. |
| 6,079,020 A | | 6/2000 | Liu |
| 6,085,249 A | | 7/2000 | Wang et al. |
| 6,104,711 A | | 8/2000 | Voit |
| 6,104,727 A | | 8/2000 | Moura et al. |
| 6,109,971 A | * | 8/2000 | Vadlakonda ............. 439/620.03 |
| 6,112,251 A | | 8/2000 | Rijhsinghani |
| 6,122,740 A | | 9/2000 | Andersen |
| 6,130,879 A | | 10/2000 | Liu |
| 6,140,911 A | | 10/2000 | Fisher et al. |
| 6,144,399 A | | 11/2000 | Manchester et al. |
| 6,144,668 A | | 11/2000 | Bass et al. |
| 6,151,629 A | | 11/2000 | Trewitt |
| 6,169,741 B1 | | 1/2001 | LeMaire et al. |
| 6,174,182 B1 | * | 1/2001 | Kuo .............................. 439/181 |
| 6,175,569 B1 | | 1/2001 | Ellington, Jr. et al. |
| 6,182,846 B1 | | 2/2001 | Leschinger et al. |
| 6,192,051 B1 | | 2/2001 | Lipman et al. |
| 6,215,785 B1 | * | 4/2001 | Batruni et al. ................ 370/360 |
| 6,230,203 B1 | | 5/2001 | Koperda et al. |
| 6,233,613 B1 | | 5/2001 | Walker et al. |
| 6,236,654 B1 | | 5/2001 | Egbert |
| 6,243,749 B1 | | 6/2001 | Sitaraman et al. |
| 6,249,528 B1 | | 6/2001 | Kothary |
| 6,259,691 B1 | | 7/2001 | Naudus |
| 6,263,368 B1 | | 7/2001 | Martin |
| 6,276,502 B1 | * | 8/2001 | Leyba et al. ............. 191/12.2 R |
| 6,321,245 B1 | | 11/2001 | Cukier et al. |
| 6,331,983 B1 | | 12/2001 | Haggerty et al. |
| 6,338,053 B2 | | 1/2002 | Uehara et al. |
| 6,345,051 B1 | | 2/2002 | Gupta et al. |
| 6,359,881 B1 | | 3/2002 | Gerszberg et al. |
| 6,374,229 B1 | | 4/2002 | Lowrey et al. |
| 6,388,782 B1 | | 5/2002 | Stephens et al. |
| 6,399,883 B1 | * | 6/2002 | Lhota ............................ 174/101 |
| 6,401,119 B1 | | 6/2002 | Fuss et al. |
| 6,418,125 B1 | | 7/2002 | Oran |
| 6,420,963 B1 | * | 7/2002 | Rossetti et al. ................ 439/207 |
| 6,421,675 B1 | | 7/2002 | Ryan et al. |
| 6,448,500 B1 | * | 9/2002 | Hosaka et al. ............ 174/113 R |
| 6,466,986 B1 | | 10/2002 | Sawyer et al. |
| 6,480,488 B1 | | 11/2002 | Huang |
| 6,526,479 B2 | | 2/2003 | Rosenzweig |
| 6,529,691 B2 | | 3/2003 | Guy et al. |
| 6,535,983 B1 | | 3/2003 | McCormack et al. |
| 6,538,577 B1 | | 3/2003 | Ehrke et al. |
| 6,542,964 B1 | | 4/2003 | Scharber |
| 6,553,031 B1 | | 4/2003 | Nakamura et al. |
| 6,556,574 B1 | | 4/2003 | Pearce et al. |
| 6,570,880 B1 | | 5/2003 | Coden |
| 6,580,715 B1 | | 6/2003 | Bare |
| 6,603,769 B1 | | 8/2003 | Thubert et al. |
| 6,633,567 B1 | | 10/2003 | Brown |
| 6,643,566 B1 | | 11/2003 | Lehr et al. |
| 6,667,967 B1 | * | 12/2003 | Anderson et al. ............. 370/351 |
| 6,674,971 B1 | | 1/2004 | Boggess et al. |
| 6,768,738 B1 | | 7/2004 | Yazaki et al. |
| 6,813,279 B1 | | 11/2004 | Trainin |
| 6,822,955 B1 | | 11/2004 | Brothers et al. |
| 6,829,651 B1 | | 12/2004 | Bass et al. |
| 6,917,614 B1 | | 7/2005 | Laubach et al. |
| 6,931,003 B2 | | 8/2005 | Anderson |
| 6,931,183 B2 | | 8/2005 | Panak et al. |
| 6,954,859 B1 | | 10/2005 | Simerly et al. |
| 7,000,026 B2 | | 2/2006 | Beshai et al. |
| 7,016,365 B1 | | 3/2006 | Grow et al. |
| 7,054,376 B1 | | 5/2006 | Rubinstain et al. |
| 7,072,407 B2 | | 7/2006 | Schurig |
| 7,200,152 B2 | * | 4/2007 | Binder .......................... 370/463 |
| 7,257,118 B2 | | 8/2007 | Chase et al. |
| 7,392,223 B1 | | 6/2008 | Ganesan et al. |
| 7,577,857 B1 | * | 8/2009 | Henderson et al. ........... 713/320 |
| 2002/0013858 A1 | | 1/2002 | Anderson |
| 2002/0033416 A1 | | 3/2002 | Gerszberg et al. |
| 2002/0037054 A1 | * | 3/2002 | Schurig .......................... 375/257 |
| 2002/0176403 A1 | * | 11/2002 | Radian .......................... 370/352 |
| 2005/0083784 A1 | * | 4/2005 | Iseli et al. ....................... 367/60 |
| 2005/0232278 A1 | | 10/2005 | Anderson |
| 2005/0249116 A1 | | 11/2005 | Anderson |
| 2007/0121634 A1 | | 5/2007 | Anderson |

FOREIGN PATENT DOCUMENTS

| | | |
|---|---|---|
| WO | 00/70808 | 11/2000 |

OTHER PUBLICATIONS

Response to Official Action in U.S. Appl. No. 11/318,396 dated Dec. 30, 2008, mailed Apr. 30, 2009, 13 pages.
Official Action in U.S. Appl. No. 11/318,396 dated Aug. 3, 2009, 7 pages.
Response to Official Action in U.S. Appl. No. 11/318,396 dated Aug. 3, 2009, mailed Nov. 2, 2009, 12 pages.
Official Action in U.S. Appl. No. 11/318,396 dated Feb. 29, 2010, 6 pages.
Response to Official Action in U.S. Appl. No. 11/318,396 dated Feb. 29, 2010, mailed May 19, 2010, 11 pages.
Official Action in U.S. Appl. No. 11/318,396 dated Jun. 11, 2010, 7 pages.
Official Action in U.S. Appl. No. 11/514,294 dated Feb. 9, 2009, 23 pages.
Response to Official Action in U.S. Appl. No. 11/514,294 dated Feb. 9, 2009, mailed Jun. 9, 2009, 13 pages.
Official Action in U.S. Appl. No. 11/514,294 dated Oct. 16, 2009, 24 pages.

Response to Official Action in U.S. Appl. No. 11/514,294 dated Oct. 16, 2009, mailed Jan. 14, 2010, 15 pages.
Official Action in U.S. Appl. No. 11/514,294 dated Mar. 31, 2010, 28 pages.
Response to Official Action in U.S. Appl. No. 11/514,294 dated Mar. 31, 2010, mailed Jun. 1, 2010, 16 pages.
Official Action in U.S. Appl. No. 09/500,887 dated Apr. 24, 2001, 6 pages.
Response to Official Action in U.S. Appl. No. 09/500,887 dated Apr. 24, 2001, mailed Aug. 30, 2001, 3 pages.
Official Action in U.S. Appl. No. 09/500,887 dated Nov. 27, 2001, 5 pages.
Response to Official Action in U.S. Appl. No. 09/500,887 dated Nov. 27, 2001, mailed Mar. 12, 2002, 5 pages.
Official Action in U.S. Appl. No. 09/500,887 dated Jun. 4, 2002, 6 pages.
Response to Official Action in U.S. Appl. No. 09/500,887 dated Jun. 4, 2002, mailed Oct. 9, 2002, 10 pages.
Official Action in U.S. Appl. No. 09/500,887 dated Dec. 30, 2002, 4 pages.
Response to Official Action in U.S. Appl. No. 09/500,887 dated Dec. 30, 2002, mailed May 27, 2003, 5 pages.
Metropolitan Area Networks, Matthew N. O. Sadiku, 1994, CRC Press Inc., pp. 1-3, 5, 8-10, 12, 13, 15-17, 19, 20.
Carl-Mitchel et al, "Using ARP to Implement Transparent Subnet Gateways," Texas Internet Consulting, Oct. 1987, 8 pages.
J. Postal, "Multi-LAN Address Resolution," ISI, Oct. 1984, 15 pages.

* cited by examiner

METHOD AND APPARATUS FOR AN ENVIRONMENTALLY HARDENED ETHERNET NETWORK SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to an environmentally hardened ETHERNET-type network, herein called a Neighborhood Area Network (NAN). More particularly the invention relates to apparatus and methods for power distribution while improving reliability and extending maximum usable distance between active elements in an environmentally harsh practical NAN.

A NAN differs from a Local Area Network (LAN) in several ways: 1) a NAN deploys environmentally hardened cable and connector technology in addition to aerial and underground buried enclosures, techniques and technology; 2) a NAN provides a self-sufficient power distribution system integrated with an environmentally hardened data distribution system to power environmentally hardened repeaters, hubs and switches; and 3) network active elements are employed which are configured to increase the average distance between the active elements.

DESCRIPTION OF THE RELATED ART

Several types of LANs have been developed, including ATM, Frame Relay, Token Ring, and particularly Ethernet as set forth by the IEEE 802.3 standard. Under this standard, in section 802.3u, 100Base-TX (100 Mbit) baseband data signals are transferred over insulated copper wires called unshielded twisted pairs (UTP) such as CAT-5, with one set of pairs used for communication down the line toward network devices (the down link) and a second twisted pair is used for communication up the line (to the server, the up link). However, the designated transmission distances are limited to the IEEE 802.3 specified 100 meter maximum that is based upon CSMA/CD collision domain and CAT-5 attenuation criteria. Hence, when significantly longer distances are required (and economics justify it), the more expensive 100Base-FX fiber optic technique has been employed. Compared to CAT-5, fiber cable has much higher capital and outdoor installation costs to terminate and to protect the delicate fibers. Fiber transceiver nodes are also much more expensive than for copper based twisted pair. Consequently, economics have encouraged the widespread proliferation of 100Base-TX CAT-5 based LAN systems, with fiber used only for longer trunk lines between work groups. Fiber cable is a dielectric and cannot conduct electrical power. (In this document the term CAT-5 is used to represent the broad variety of UTP network cable, including CAT-5e, CAT-6 and shielded pair cable.) Recent developments in 1000BaseT technology include the copper based 802.3ab specification and 802.3z fiber specification, which are competing with several other Gigabit and "10Gig" technologies, that in time may or may not prove their value in the marketplace. It is anticipated that the electrical specifications will benefit from the environmental hardening addressed by the present invention.

LANs are deployed within premises (for networking work stations and their peripherals) and usually have access to the environmental protection and AC power system of the premises. CAT-5 with RJ-45 connectors is the cabling configuration conventionally deployed for interconnecting network equipment (such as a hub, switch or network interface card or NIC). The RJ-45 is an 8 position, 8 contact plastic connector related to the RJ-11 (6 position, 2 or 4 conductor) telephone wire type of connector. Most RJ-45 connectors are inexpensive and readily connected to the 4 pairs of a CAT-5 with a commercial crimping tool. Most network devices have RJ-45 jacks for receiving CAT-5/RJ-45 plugs.

However, RJ-45 connectors have reliability limitations related to the mechanical design of the contacts. Outdoor deployment of RJ-45 connections has resulted in reliability concerns. The jack portion of the connector consists merely of wires that are slightly springy and held in position by grooves in the body of the connector. The plug portion of the RJ-45 connector consists of thin conductor elements sandwiched between plastic insulation that is the body of the RJ-45 plug. Contact is made between the wires in the jack and the conductors in the plug over approximately 0.06 in length of the plug conductors. The contact is a low reliability single-surface contact because the contact area is so small and because the RJ-45 plug is held in the jack by a plastic arm that is not positive enough to hold the plug securely in the jack when torque or stress is applied to the CAT-5 wire mechanically crimped to the jack. Consequently, particularly in harsh outdoor installations and even in indoor environments, the RJ-45 jack demonstrates reliability problems. The mechanical problems are increased in the outdoor environment not only due to the temperature extremes, high humidity and dirt levels but also because the outdoor gel filled CAT-5 that is deployed in outdoor environments is so stiff that it multiplies the torque applied to the plug and increases the unreliability of the single-surface connections.

LANs usually employ the standard premises AC power system to supply power to the network components. Often a wall transformer/power supply is plugged into an AC outlet and connected via barrel connector to each hub or switch. Larger switches may contain their own power supply. But when the installation of certain components must be made in locations that are not conveniently proximate to AC power sources, power must be supplied either by installing retrofit AC power circuits, by using batteries or by employing the CAT-5 wiring itself.

Conventional CAT-5 cable contains 4 twisted pairs: one pair for uplink signals; a second pair for down link signals, while the third and/or fourth pairs, not normally used for signals, may be used for limited power distribution. The amount of power that can be transferred via CAT-5 cable is limited by the resistance of 24 gauge CAT-5 wire (9-10 ohms per 100 m) as well as the dielectric and electrical code limitations on voltage range (23060V, depending on jurisdiction). On a practical basis, the total equivalent resistance for the power circuit comprises the sum of the source and return wire resistances. For example, a 6 Watt switch operating at 3.3 V consumes nearly 2 A, which in turn dictates that a 100 meter length of CAT-5 would drop nearly 34 V and 60 Watts in the wire alone (clearly impractical). U.S. Pat. No. 5,994,998 describes an alternate technique for using the signal pairs in a CAT-5 cable to carry power, thereby reducing the resistance by a factor of 2. However, the technique described in this patent remains impractical (for longer distances, at least). The U.S. Pat. No. 5,994,998 technique is further limited by the following factors: 1) the degradation of the signal to noise ratios caused by increased noise generated by power supply current through greater lengths of cable on top the decreased signal level; and 2) the high cost of quality inductors required to isolate signals from power without seriously altering the delicate IEEE 802.3u spec for 100Base-TX signals. Further, if the other 2 pairs are used for a second set of signals to a separate network device, then crosstalk noise becomes a serious issue over longer lengths of CAT-5 approaching the 100 m limit.

What is needed is a cabling scheme and method of deployment, which address and overcome the practical limitations to the use of CAT-5 type wiring in an environmentally harsh environment.

SUMMARY OF THE INVENTION

According to the invention, in an environmentally hardened network, a data and power distribution cable is employed in connection with reliable end connectors, high performance physical layer transceivers clocked at a lower rate than is specified and full duplex switched packet transmission techniques between switched nodes in order to extend operational distance between network elements. In a specific embodiment, the data and power distribution cable comprises a data distribution element, a power distribution element, an optional strain distribution element, an optional hollow conduit, and an extra shield and outdoor sheath. The cable may incorporate: 1) a Gel filled outdoor UTP (CAT-5) cable; 2) end connectors of type DB-9 [D-Sub] for connection of the UTP to network equipment; 3) power transmission cable of wire gauge sufficient to carry the power required by network equipment (switches, etc) for the specific segment of the network; and optionally 4) a hollow conduit that permits installation of optical fiber before or after installation of the cable.

For reliability in the outdoor environment, the NAN requires the use of a mechanically and electrically reliable connector. An example of a preferred embodiment is a DB-9 plug and jack for the cable and the network equipment. The preferred connectors are configured to maintain adequate physical and electrical contact over a range of operationally harsh environmental conditions. The connectors preferably have gold plated pins and sockets and make contact with each other over the entire circumference and length of the pins; the plugs and receptacles of the special connectors interlock with protective housings or shells that shield the contact area from dirt, moisture and EMI and that contain within the contact area protective contact dielectric gel; and the plugs and receptacles have secured mechanical clasping mechanisms such as screws and threads that clamp the connectors together, providing strain relief from cable torque or stress. The entire construction provides much more mechanical robustness and environmental integrity for either indoor or outdoor network data connections.

According to a specific embodiment of the invention, high performance physical layer transceivers (herein high PHYs) are employed at lower than specified clock rates in the network equipment to extend range and increase reliability. According to a further specific embodiment of the invention, full duplex switched packet transmission techniques are used between switched nodes thereby avoiding distance limiting CSMA/CD protocols.

To increase the data rate of the NAN backbone with minimal cost, several copper (or fiber) ports can be "trunked" over a single CAT-5 by using all 4 pairs, 2 for each of the 2 ports. In trunking, UTP pairs support simultaneous transmission in a common direction in a manner that share data traffic between them. This technique can provide a data rate increase from 100 Mbps to 200 Mbps full duplex (400 Mbps total) with very little increase in cost. The DB-9 connector can be structured to provide both ports at a single connector to facilitate the trunking option, or the power lines can be branched within a secure enclosure to a high current power connector and power distribution network, from which power is shunted to local equipment.

The invention will be understood with reference to the following detailed description in connection with the accompanying drawings.

DETAILED DESCRIPTION OF THE INVENTION

Figure 1:
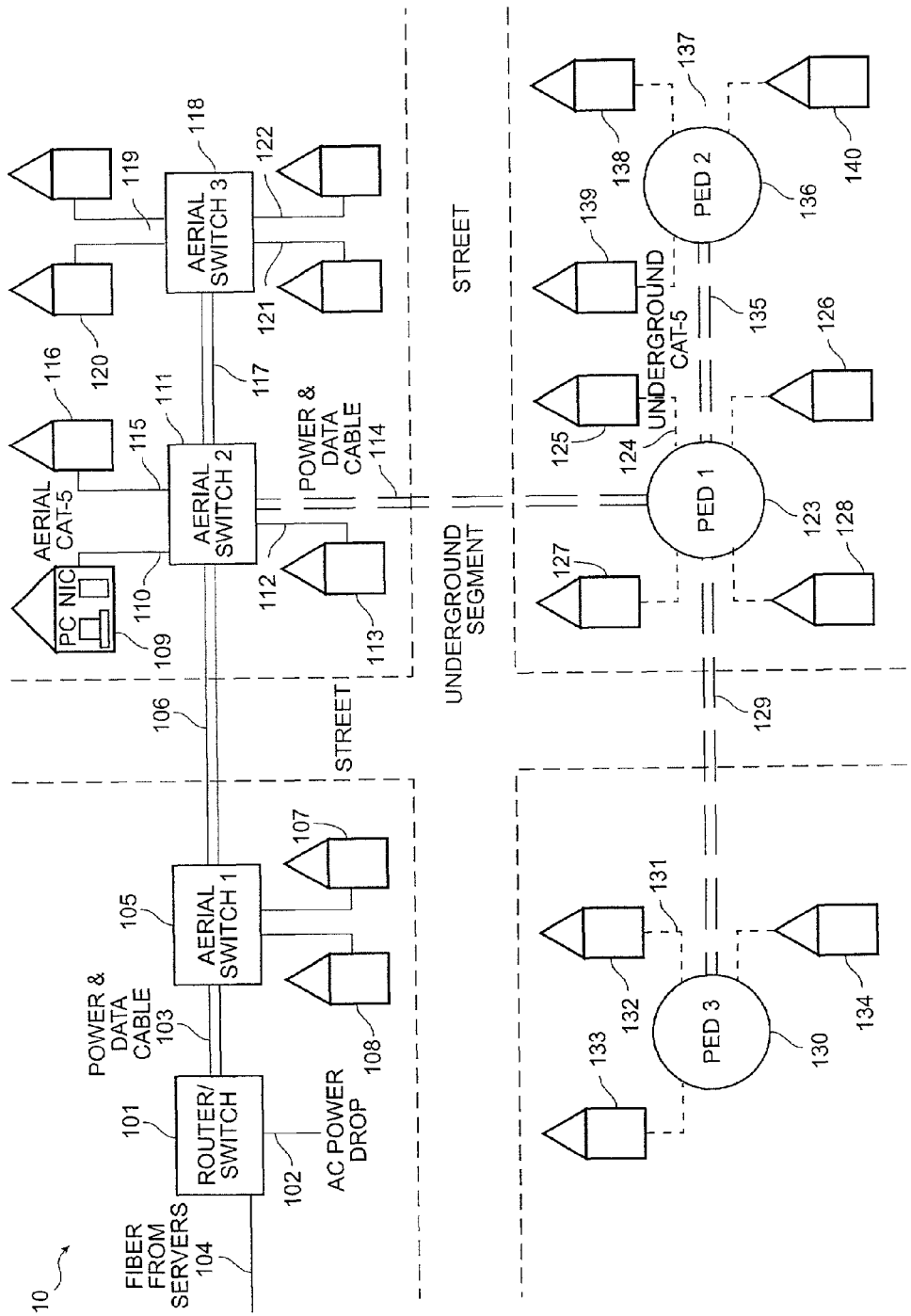
FIG. 1 is a block diagram of a power and data distribution system in an environmentally hardened network according to the invention.

FIG. 1 is a diagram of an environmentally hardened network, herein a NAN system 100, that integrates both data and power distribution function. A NAN Distribution box 101 contains a switch or, if enhanced, a router for connecting to a larger environmentally hardened ETHERNET network. It is assumed that there is a network operation center (NOC) (not shown) providing various network services via ETHERNET protocols. This distribution may be via fiber cabling 104, for example, The NAN fiber uplink cable 104 could also be part of a routed fiber loop running gigabit Ethernet or other high-speed fiber protocols. Distribution box 101 may be powered by AC power drop 102 that sources metered AC power (115/230V AC in the US) from a utility company service line or generator. Distribution box 101 supplies power and data through a cable 103 according to the invention to at least one distribution segment of the NAN, as illustrated. NAN cable 103 carries data and power to the uplink port of a switch 1 105 (such as an aerial enclosure or a buried enclosure) that in turn downlinks both power and data to the uplink port of a switch 2 111 as for example across a street or other right-of-way. Switch 1 105 also downlinks data through conventional outdoor CAT-5 to premises/homes 107 and 108. Switch 2 111 downlinks data through outdoor CAT-5 UTP cabling 110, 112 and 115 to premises 109, 113 and 116. Premises 109 illustrates a conventional personal computer (PC) connection via direct connection to a conventional network interface card (NIC) to CAT-5 110. CAT-5 110 is operably installed from the aerial wiring into premises 109 to the room in which the PC is located. This represents a variety of premises network devices served by the NAN. Any of the premises represented diagrammatically by the "house" symbol can be any type of residential, commercial or industrial structure or enclosure containing network devices. Aerial switch 111 also downlinks data and power via NAN cable 117 to the uplink port of aerial switch 3 118.

FIG. 1 also illustrates the underground or buried type of NAN installation. Switch 2 111 also downlinks data and power through buried environmentally hardened NAN cable 114 according to the invention and under a street to the uplink port of a first pedestal (Ped 1) 123 providing underground wiring services to customers. Ped 1 123 in turn provides downlinks of data to customers 125 through 128 through buried outdoor CAT-5 124, etc. In addition Ped 123 provides downlinks of data and power to Peds 130 and 136 via underground cable 129 and 135, respectively, that in turn provide downlinks of data to premises 132 through 134 and 138 through 140.

Any practical number of downlink aerial or pedestal mount switches is permitted. The suitable number of switched nodes and ultimate length or distance of the segments is determined by power supply capacity, power distribution current capacity as determined by wire gauge (wire size), switch power consumption, average network loading per customer, the number of customers per distribution segment and data latency for specific applications. Power supply boxes can be installed where needed to supply system power to remote locations of a NAN distribution segment, with AC power supplied by extra distribution wires in the cable or by additional power drops, where available. Any switch can downlink to as many nodes or additional switches as it has ports available.

Figure 2:
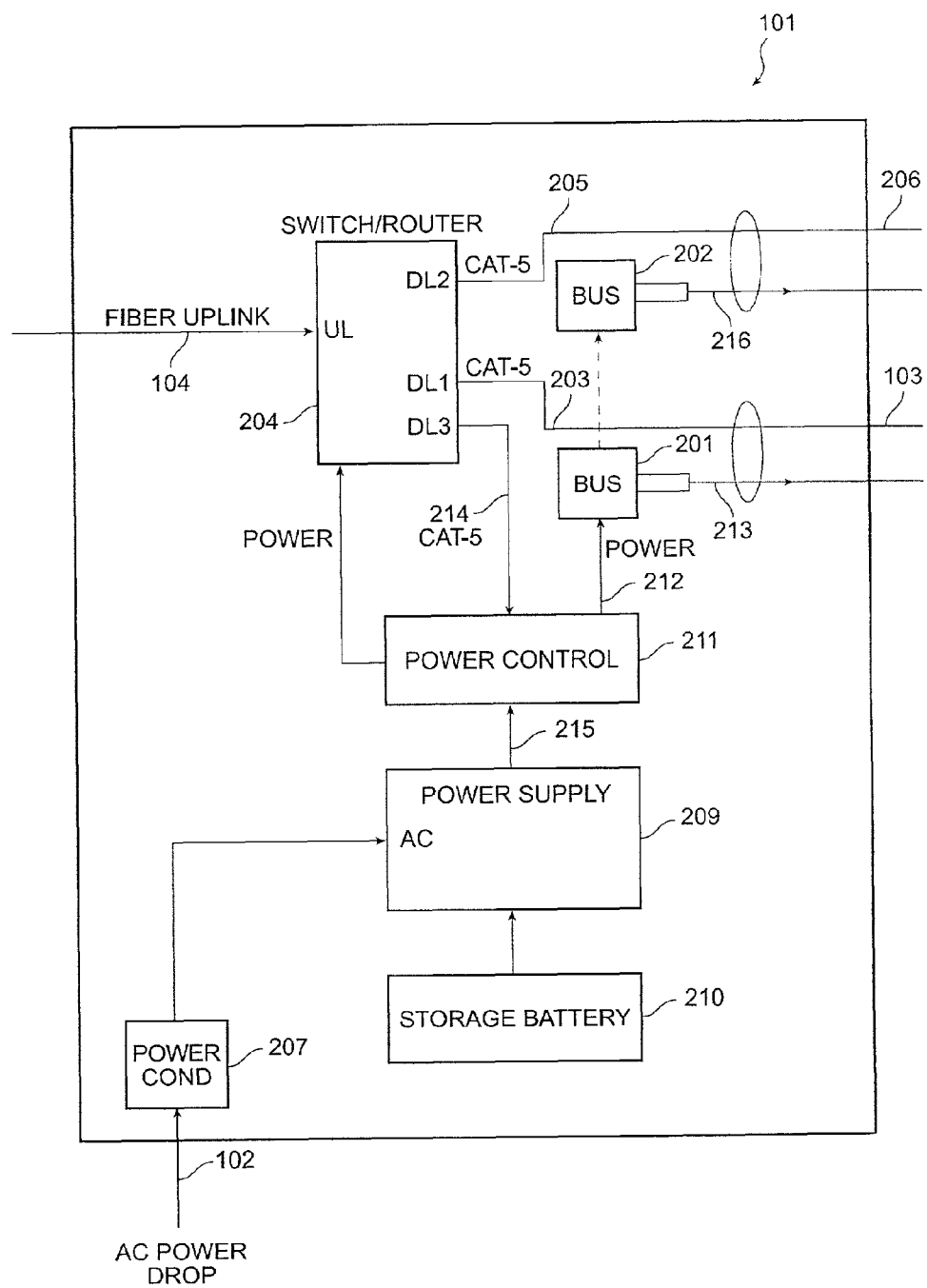
FIG. 2 is a block diagram of a typical data and power distribution node.

FIG. 2 is a diagram of a NAN distribution box 101 illustrating its typical internal components with their connections to other components of a NAN distribution system 100. Fiber or other media uplink cable 104 is operably connected to a switch or router element 204 through its uplink port UL. Cables 103 and optionally 206 according to the invention each distribute data and power to distribution elements, such as switch 1 105 (FIG. 1). Data from switch 204 through downlink port 1 DL1 is connected via environmentally-hardened DB-9 connector to CAT-5 cable 203 of distribution cable 103. Similarly, data from downlink port 2 DL2 is connected via DB-9 connectors to the CAT-5 cable 205 of distribution cable 206. Power through cable 212 is distributed via bus 201 to the power section 213 of distribution cable 103 and, similarly, power via extensions of cable 212 is distributed via bus 202 to the power portion 216 of distribution cable 206. Any practical number of distribution segments can be served by a distribution box 101. A typical network device served by the distribution box is a network switch.

It is economically prohibitive to employ 50 Ampere power drops from utility power lines where only two to ten watts of network device power is required. The power for at least one network segment can be supplied from AC power drop 102 by power conditioner 207 that filters out transients and EMI, limits current for fault conditions and supplies conditioned AC to power supply 209. Optionally a transformer may provide robust (4 KV) isolation from common mode power supply transients. Storage battery 210 provides DC power to power supply 209 in the event that AC power 102 is interrupted for any reason. Together with power control 211, an uninterruptible power supply (UPS) services the power requirements of network equipment on associated segments. Storage battery 210 may be sized to permit the backup time required by a particular environment and applications.

The power distribution system is integrated with the data transmission system by means of shielded 10 gauge to 16 gauge wire or by use of coaxial cable of sufficient gauge in the center conductor to support currents as high as 60 Amperes, but typically on the order of 15 Amperes. Integration of the power distribution system into the NAN is necessary because it is unacceptable technically and logistically to power network switches and hubs from a customer's premises power and because it is economically prohibitive Power control 211 permits remote control and diagnostics of the power supply for distribution segments and switch/router 204 for increased reliability. Power control 211 typically contains a network port with a communications controller (not shown) for connection via CAT-5 214 to network administration resources provided by switch/router 204.

Figure 3:
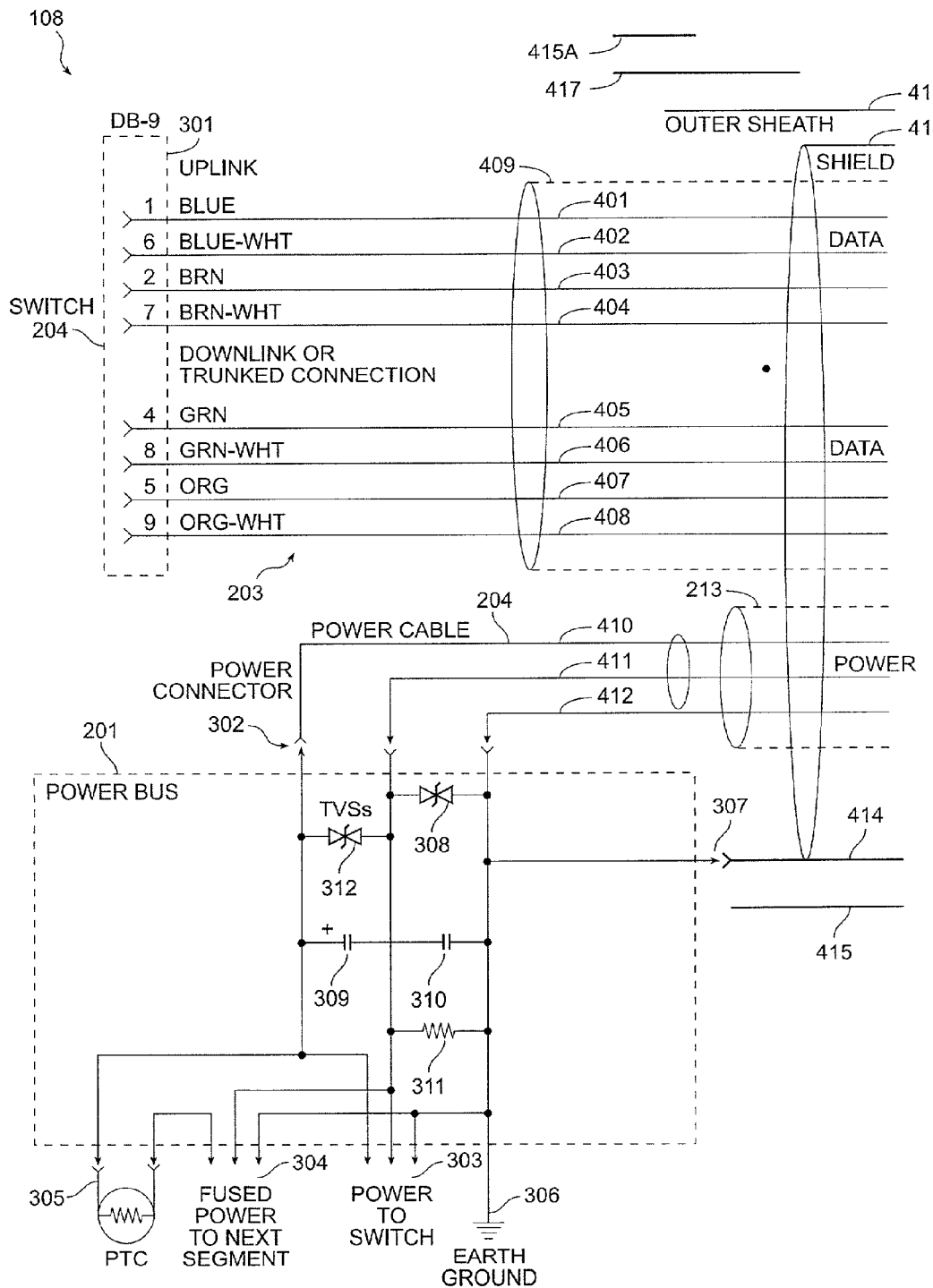
FIG. 3 is a schematic diagram of a cable connection and power manager according to the invention.
Figure 4:
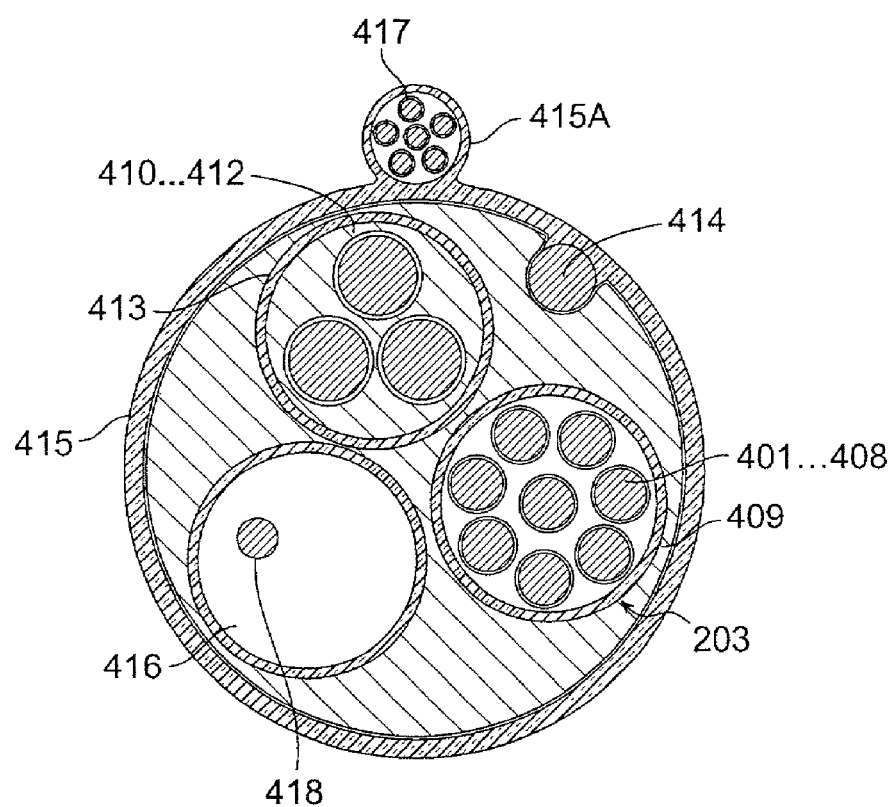
FIG. 4 is a cross-sectional view of an environmentally hardened cable for data and power distribution according to the invention.

FIG. 3 provides a schematic of NAN cable 108 (106, 114, 117, 129 or 135) according to the invention suitable for NAN requirements. FIG. 4 is a cross-section of such a cable. The overall cable 108 is covered with a heavy weather resistant outer sheath 415 outside a foil shield and drain wire 414, which provides EMI and electrostatic discharge protection. This permits the cable to be sown underground with a vibratory plow, pulled through buried conduit or lashed to aerial wiring systems. A removable strain cable 417 siamesed to the outer sheath by a sheath extension 415A provides for suspension and strain relief. A UTP cable 203 comprises at least four twisted pairs 401 through 408 (CAT-5 standard) and incorporates low loss electrical design to extend signal transmission range. A UTP insulating sheath 409 is also provided which increases environmental and mechanical robustness. DB-9 connector 301 and power connector 302 permit increased reliability and connection to network devices. The first port employs two twisted pairs that are color-coded. For example, a blue pair (wires 401 and 402) and a brown pair (wires 403 and 404) are connected to corresponding pins 1, 6, 2 and 7 of connector 301. An optional second port employs a green pair (wires 405 and 406) and an orange pair (wires 407 and 408) that are connected to corresponding pins 4, 8, 5 and 9 of connector 301. Each pair of wires supports transmission in one direction such that two pairs support a full duplex network connection. Providing four pairs permits the internal logic of a switch (204) to be configured by network managers to "trunk" the data of two ports together to double the data rate of a NAN connection. Alternatively, two independent network connections may be made through one connector (and one cable) or through two separate connectors and two separate cables.

Referring again to FIG. 3, power cable 213 permits transmission of power between remote NAN power supplies and NAN devices. Power shield 412 (incorporating a ground return wire) reduces EMI from entering or leaving the power distribution wires as well as providing a competent return path for accidental shorts. Insulated power wires 410 and 411 are sized according to NAN segment load requirements and power distribution voltages of to permit adequate transmission of NAN power. Insulation sheath 413 insulates and environmentally protects power wires and shield.

Power cable 213 is connected to power bus 201 via connector 302. Power bus 201 contains power filtering and transient protection devices as well as bus connectors 303 and 304 for distributing power to other network segments. Bus 201 also connects NAN cable shields to ground by means of ground pins on all power cable connectors and by means of ground connectors 306 and 307. Common mode transient and EMI filtering is provided by Transient Voltage Protector (TVS) 308 and capacitor 310, while differential over voltage, transient and EMI filtering is provides by TVS 312 and capacitor 309. Resettable fuse (or positive temperature coefficient thermistor) 305 also provides over current/short circuit protection for selected branches of the NAN power distribution system.

Use of a properly sized ground return wire permits employment of higher distribution voltages in the power wires, in compliance with electric and safety codes. Employment of a higher distribution voltage provides for lower distribution current with attendant lower copper power losses. (P=VI). Thus, by using higher voltage (60V or higher) switching regulators in network devices, a 60 VDC or ACpeak (100 W) distribution voltage can provide power for over thirty 8-port switches in a copper NAN segment distributed over 10,000 feet of NAN cable and economically networking over 120 houses in a neighborhood. The capability of providing 5000-10,000 foot long copper NAN distribution segments also permits convenient and economical installation of distribution boxes at central locations for connection to AC line power taps as well as fiber or copper uplinks to the NAN servers.

Referring to FIG. 4, to facilitate pulling of fiber cable through tube 416, a messenger wire 418, such as a stainless steel wire, may be installed during the manufacturing process. Alternate commercial techniques are available for installing fiber into the fiber buffer tube 416 during or after the manufacturing or installation process. Individual shielding of wires or pairs of wires can accommodate special transmission criteria for special copper physical layer data transmission technologies.

Figure 5:
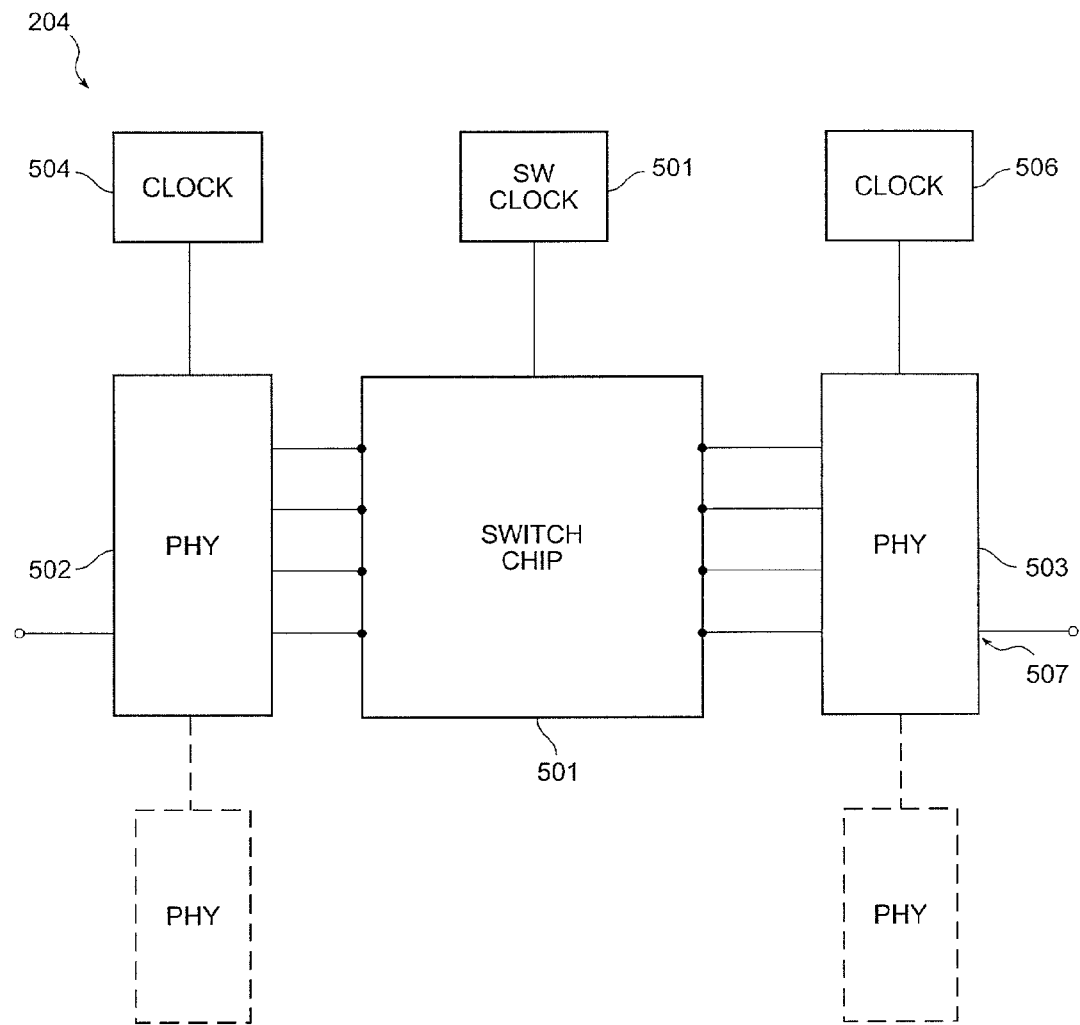
FIG. 5 is a block diagram of a switch containing a high performance physical layer transceiver for each port.

FIG. 5 is a block diagram of a switch 204 with high performance physical layer transceivers (PHY) 502, 503 (representing 2 of 2N ports) and a switch chip 501. A suitable switch chip is a type AL125 chip from Broadcom of Irvine, Calif. Intel Corporation of Santa Clara, Calif. also manufactures a suitable switch chip such as a Model IXE2412 or IXE2424 device. A suitable PHY 502 or 503 is of the Alaska™ family of 1000BaseT transceivers, such as a type 88E/1000 Gigabit Ethernet transceiver from Marvell Company of Sunnyvale, Calif. A choice of a single clock input or multiple clock inputs is accommodated. The receive and transmit clocks 504 for the PHY 502 are typically set at less than the design clock speed of the PHY in order to promote greater distance between nodes. Under clocking down to one tenth of the 125 MHz design clock rate can extend PHY transmission range to over 500 m at 100 Mbps. The PHY at the uplink port of the next switch (switch 105 for example) requires matching under clocking rates to achieve best performance with PHY 502. Switch clock 505 for the switch chip 501 may be totally independent of clock 504 or 506. Clock 506 may be set for PHY 503 to operate with a fiber port 104 or with another UTP port operating at Gigabit speeds. The typical PHY 502 performs A to D conversion on received signals from connector 301 via isolation module 508, performs detection and some intelligent filtering and packaging of packets, then provides digital signals to the switch chip 501, which then redirects and forwards the reconstructed digital signals to a destination PHY 503, which in turn performs D to A conversion for the transmitted analog signal at the destination port 507 for transmission over link 104.

The invention has been explained with reference to specific embodiments. Other embodiments will be evident to those of ordinary skill in the art. It is therefore not intended that this invention be limited except as indicated by the appended claims.

What is claimed is:

1. A network, comprising:
   a first network device located outdoors and above ground, wherein the first network device is coupled to an AC power source and includes a first data connector and a first power connector;
   an outdoor, above-ground cable, wherein the cable is greater than 100 meters in length and includes a first set of wires and a second set of wires within an outer sheath, wherein the cable is configured to carry data on the first set of wires, wherein the cable is further configured to carry power on the second set of wires, wherein the cable includes, at a first end of the cable, a first connector that couples the first set of wires to the first data connector, and wherein the cable includes, at the first end of the cable, a second connector that couples the second set of wires to the first power connector, and wherein the cable includes, at a second end of the cable, a third connector coupled to the first set of wires and a fourth connector coupled to the second set of wires; and
   a second network device coupled to the first network device via the cable, wherein the second network device includes a second data connector and a second power connector that are respectively coupled at the second end of the cable to the third and fourth connectors, wherein the second network device is configured to operate without a direct coupling to an AC power source;
   wherein the second network device is configured to receive data and power from the first network device via the cable; and
   wherein the first and second network devices include physical layer transceivers having a specified clock rate and are configured to communicate data at 100 Mbps via the cable over distances greater than 100 meters by using clock rates for the physical layer transceivers that are lower than the specified clock rate.

2. The network according to claim 1, wherein said second set of wires supports current up to 60 amperes.

3. The network according to claim 1, wherein said first set of wires includes at least four unshielded twisted-wire pairs configured to carry said data, wherein said first network device is configured to operate in a mode in which data is supplied to the second network device over two of the unshielded twisted-wire pairs in parallel.

4. The network according to claim 3, wherein said cable further includes an insulating sheath surrounding said unshielded twisted-wire pairs.

5. The network according to claim 4, further including a foil sheathing around said first set of wires and said second set of wires and further including a drain wire juxtaposed to said foil sheathing and disposed parallel to said first set of wires and said second set of wires.

6. The network according to claim 5, further including a suspension line bound to said cable and configured to provide stress relief for said cable.

7. The network according to claim 4, further including:
   a conduit that permits installation of optical fiber within the conduit before or after installation of the cable.

8. The network according to claim 7, wherein said conduit is of a pliant material having walls of sufficient rigidity to be self-supporting without collapsing.

9. The network according to claim 3, wherein said physical layer transceivers are configured to operate over said unshielded twisted-wire pairs in full duplex switched packet transmission mode.

10. The network according to claim 1, wherein said first set of wires includes a plurality of unshielded twisted-wire pairs configured to carry data, and wherein said physical layer transceivers are configured to operate over said unshielded twisted-wire pairs in full duplex switched packet transmission mode.

11. The network according to claim 1, wherein the first and second connectors contain a protective contact dielectric gel within contact areas of the first and second connectors.

12. The network of claim 1, wherein the second set of wires includes shielded 10 to 16 gauge wires.

13. The network of claim 1, wherein the second set of wires are within a coaxial cable inside the outdoor, above-ground cable, wherein the coaxial cable is of sufficient gauge in the center conductor to support currents as high as 60 amperes.

14. The network of claim 1, wherein the second network device is an aerial switch connected to one or more customer premises.

15. The network of claim 1, wherein the first network device is coupled to a fiber backbone.

16. The network of claim 1, wherein the first network device includes a power conditioner unit coupled to the AC power source, wherein the power conditioner unit is configured to receive AC power from the AC power source, perform filtering, and provide conditioned AC power to a power supply within the first network device.

17. A cable, comprising:
a first section including at least four unshielded twisted-wire pairs configured to carry data at 100 Mbps between first and second network devices coupleable to opposing first and second ends of the cable;
a second section including at least a pair of insulated wires configured to carry power from the first network device to the second network device;
a first connector that terminates the first section at the first end of the cable;
a second connector that terminates the second section at the first end of the cable; and
a weather-resistant outer sheath surrounding at least the first section and the second section;
wherein the at least four unshielded twisted-pair wires included in the first section of the cable are uninterrupted over a length greater than 100 meters, and wherein the insulated wires configured to carry power are between 10 and 16 gauge and are further configured to carry a current of up to 60 amperes without impeding the ability of the at least four unshielded twisted-wire pairs to carry data at 100 Mbps over the length greater than 100 meters.

18. The cable of claim 17, further comprising:
a tube configured to permit installation of an optical fiber in the tube before or after installation of the cable, wherein the tube is also surrounded by the outer sheath.

19. The cable of claim 18, wherein the tube includes a messenger wire to support installation of the optical fiber.

20. The cable of claim 17, wherein the second section also includes a ground return line.

21. The cable of claim 17, further comprising:
a foil shield surrounding the first section and the second section but within the outer sheath; and
a drain wire.

22. The cable of claim 17, further comprising a removable strain cable.

23. The cable of claim 17, wherein the second section includes a coaxial cable that includes the at least a pair of insulated wires, wherein a center conductor is of sufficient gauge to support current up to 60 amperes.

24. A network, comprising:
a first node including a data connector and a power connector; and
a cable greater than 100 meters in length, wherein the cable includes:
a first portion configured to carry data, wherein the first portion includes at least four unshielded twisted pairs of wires (UTPs);
a second portion including at least two insulated wires, wherein the second portion is configured to carry power without impeding an ability of the at least four UTPs to transmit and receive data at 100 Mbps between the first node and another node;
a weather resistant outer sheath surrounding at least the first and second portions;
a first connector that terminates the first portion and a second connector that terminates the second portion, wherein the first and second connectors are located at a first end of the cable;
wherein the first connector is coupled to the data connector, and wherein the second connector is coupled to the power connector; and
wherein the first node includes a first pair of physical layer transceivers configured to send and receive portions of said data over the UTPs, wherein the pair of physical layer transceivers are clocked at rates lower than a specified clock rate for the physical layer transceivers.

25. The network of claim 24, wherein the first node also includes a switch circuit and a plurality of pairs of physical layer transceivers including said first pair, wherein the switch is configured to selectively connect different ones of said pairs.

26. The network of claim 24, wherein the first node includes a router.

27. The network of claim 24, wherein the first node includes a power supply configured to provide said power for the second portion of the cable.

28. The network of claim 24, wherein the first node includes a switch and a power control coupled to the switch, wherein the power control is configured to control provision of said power from the power supply to the second portion of the cable based on commands received from the switch.

29. The network of claim 28, wherein the first node includes a power bus configured to receive said power from the power control and provide at least a portion of said power to said second portion of the cable, wherein the power bus is also configured to provide transient voltage protection for the second portion of the cable.

30. The network of claim 24, wherein the first and second connectors and the power and data connectors have plugs and receptacles that interlock with a secure mechanical clasping mechanism.

31. The network of claim 24, wherein the first and second connectors and the power and data connectors have protective housings that shield contact surfaces from dirt, moisture and EMI.

32. The network of claim 24, wherein the second portion includes a coaxial cable.

33. The network of claim 24, wherein the at least two insulated wires in the second portion are 10 to 16 gauge wires.

34. A cable, comprising:
a first section including unshielded twisted-wire pairs configured to carry data between first and second network devices coupleable to opposing first and second ends of the cable;

a second section including at least a pair of insulated wires configured to carry power from the first network device to the second network device, wherein the at least a pair of insulated wires are between 10 and 16 gauge wires;

a first connector that terminates the first section at the first end of the cable;

a second connector that terminates the second section at the first end of the cable; and an outer sheath surrounding at least the first section and the second section;

wherein the unshielded twisted-wire pairs included in the first section of the cable are uninterrupted over a length greater than 100 meters and wherein the second section is configured to carry an electrical current without impeding an ability of the first section to carry data at 100 Mbps between two network nodes over the length greater than 100 meters.

35. The cable of claim 34, wherein the cable is greater than 300 meters in length.

36. A power and data distribution cable, comprising:

a first section including unshielded twisted-wire pairs configured to carry data between first and second network devices coupleable to opposing first and second ends of the cable;

a second section including a coaxial cable configured to carry power from the first network device to the second network device, wherein a center conductor of the coaxial cable is of sufficient gauge to support current up to 60 amperes;

a first connector that terminates the first section at the first end of the cable;

a second connector that terminates the second section at the first end of the cable; and an outer sheath surrounding at least the first section and the second section;

wherein the unshielded twisted-wire pairs included in the first section of the cable are uninterrupted over a length greater than 100 meters and wherein the second section is configured to carry an electrical current without impeding an ability of the first section to carry data at 100 Mbps between two network nodes over the length greater than 100 meters.

37. The power and data distribution cable of claim 36, wherein the cable is greater than 300 meters in length.

38. An apparatus, comprising:

a network device including at least a first physical layer transceiver;

wherein the physical transceiver is configured to communicate via a cable greater than 100 meters in length, wherein the cable includes a first set of wires configured to carry data and a second set of wires configured to carry power, wherein the first and second sets of wires are surrounded by a sheath, and wherein the first set of wires is uninterrupted over a length of greater than 100 meters; and wherein the network device is configured to transmit data via the cable at 100 Mbps over the length greater than 100 meters by employing the first physical layer transceiver at a lower than specified clock rate.

39. The apparatus of claim 38, wherein the network device is a switch that includes two or more ports;

wherein the network device includes at least a second physical layer transceiver; and wherein the network device is configured to receive data via a different cable at 100 Mbps by employing the second physical transceiver at a lower than specified clock rate, wherein the different cable is over 100 meters in length.

\* \* \* \* \*